Figure 1:
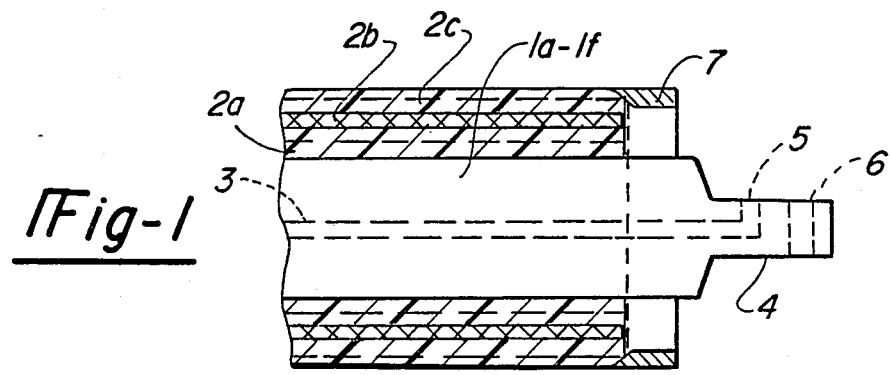

United States Patent [19]

Julien et al.

[11] Patent Number: 4,853,516

[45] Date of Patent: Aug. 1, 1989

[54] ELECTRIC CABLE PRIMARILY FOR WELDING EQUIPMENT AND WELDING DEVICE INCLUDING THE SAME

[75] Inventors: Regis Julien; Monique Antonio, both of 15 Rue de Chartre, 91400 Orsay, France

[73] Assignees: Regis Julien; Monique Antonio, both of Orsay, France

[21] Appl. No.: 190,208

[22] Filed: May 4, 1988

[30] Foreign Application Priority Data

May 7, 1987 [FR] France .............................. 87 067498

[51] Int. Cl.⁴ ........................... B23K 9/32; H01B 7/34
[52] U.S. Cl. ................................. 219/137.9; 174/15.7
[58] Field of Search ................. 174/15 C, 15 WF, 24, 174/68.1, 68.3, 136; 138/121; 219/137.9

[56] References Cited

U.S. PATENT DOCUMENTS

| 2,461,594 | 2/1949 | Flounders | 138/121 X |
| 3,082,795 | 3/1963 | Heller | 138/121 |

FOREIGN PATENT DOCUMENTS

| 1540452 | 1/1970 | Fed. Rep. of Germany | 174/15 C |
| 3511222 | 10/1986 | Fed. Rep. of Germany | 174/115 |
| 1072021 | 3/1954 | France | 174/136 |
| 1215778 | 11/1959 | France | 174/24 |
| 220444 | 3/1985 | German Democratic Rep. | 174/15 WF |
| 301545 | 10/1932 | Italy | 174/136 |
| 887029 | 1/1962 | United Kingdom | 174/15 C |

Primary Examiner—Laramie E. Askin
Attorney, Agent, or Firm—Dykema Gossett

[57] ABSTRACT

An electrical cable includes an elongated conduit with a plurality of electrical conductors therein. Each of the conductors is provided with a perforated polyurethane sheath thus providing electrical insulation among the electrical conductors. The conduit is also formed of polyurethane and is a double walled conduit. The exterior surface of the conduit is provided with longitudinal grooves or channels and the interior wall of the conduit is provided with longitudinal grooves or channels. These channels facilitate flexing of the cable. Coolant may be provided interiorly of the group of conductors and between the conductors and the inner wall of the conduit. The perforations in the polyurethane sheaths facilitate cooling. A metal collar is crimped at the end of the cable to prevent leakage of the coolant fluid and for attaching the conduit to a terminal connector. The cable is particularly useful in conjunction with a welding device.

6 Claims, 1 Drawing Sheet

ELECTRIC CABLE PRIMARILY FOR WELDING EQUIPMENT AND WELDING DEVICE INCLUDING THE SAME

The present invention relates to a flexible cable adapted to be easily twisted and is particularly useful for constituting an electrical conductor, particularly a feed conductor of the type used for transmitting electrical energy from a transformer to a manual or automatic welding head.

A typical application for the cable of the invention is the construction of cables for spot welding or for manual or automatic resistance welding (robots), used in the automotive industry.

Cables used to date for this application comprise a central, unipolar or bipolar, electrical conductor, terminated at each end by an electrical connection terminal, this conductor being protected by an insulating sheath crimped at each end onto the conductor and generally constituted by a braid covered on each face by a layer of appropriate synthetic material, these two layers respectively constituting with respect to the braid, an inner and an outer tube.

These envelopes have a relatively significant diameter with repect to the dimensions of the electrical conductor and the thicknesses of the envelopes necessary for ensuring the cable has sufficient electrical resistance for rubbing or shearing wear and as a result they are relatively difficult to bend and extremely difficult to twist.

These inconveniences can be diminished by reducing the thicknesses of the envelopes but to the detriment of the desired resistance.

The conditions of use of the cables in the automotive industry require however that the cables are sufficiently flexible so that the welding heads can reach all the points to be welded, particularly those which are situated inside the bodies and shells of automobiles and as a result the need exists to increase the flexibility of the cables in particular from the point of view of their ability to be locally twisted.

The cable of the invention responds to this need by the fact that it includes in the insulating material a number of channels which extend longitudinally.

These channels are continuous or discontinuous, rectilinear or undulating.

Preferably these channels are present in the entire cross-section of the insulating material.

As the case may be the channels are situated in the outer tube, or in the inner tube, or preferably, in the outer tube and in the inner tube at the same time.

The channels generally result from manufacture with the insulating tube, which is generally manufactured by extrusion.

Figure 2:
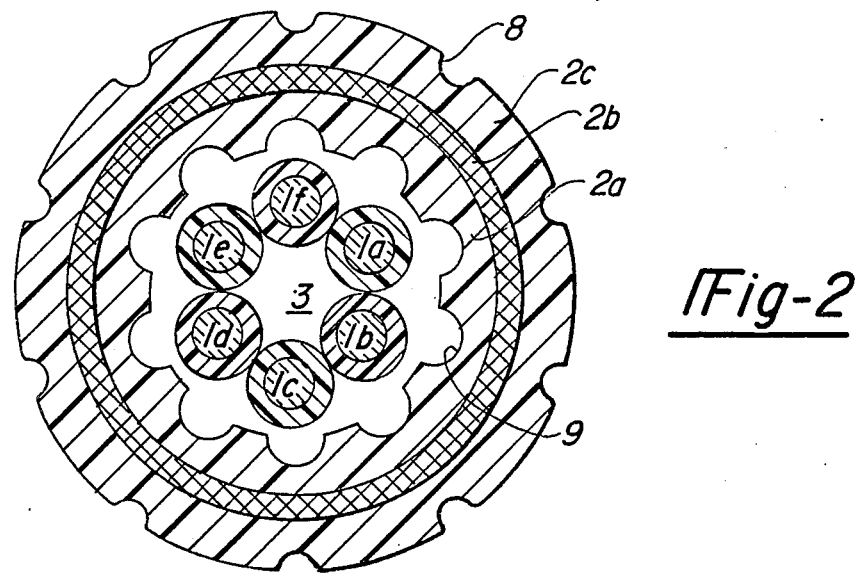

The figures of the accompanying drawing schematically illustrate an example of a cable according to the invention, in longitudinal cross-section (FIG. 1) and in transverse cross-section (FIG. 2).

The cable, in a manner known in itself, comprises a multi-strand electrical conductor $1a$–$1f$ surrounded by an insulating complex which comprises an inner tube $2a$, a "RAYON" braid $2b$ and an outer tube $2c$. The strands delimit between themselves a central longitudinal channel 3 which serves for the circulation of a cooling fluid for example water or air. At each end, the electrical conductor has a terminal 4 for electrical connection pierced by an orifice 5 in communication with the channel 3 and by a hole 6 for fixing to a welding clamp or to a transformer. At each end, the insulating complex is crimped onto the conductor for example by means of a collar 7.

In accordance with the invention, in this embodiment, the outer tube $2c$ is provided at its outer periphery with longitudinal channels 8 and the inner tube $2a$ is provided at its inner periphery with longitudinal channels 9.

The two tubes $2a$ and $2c$ are generally of plastic material and, preferably, of polyurethane, but the invention is not limited to a particular material for the constitution of the tubes.

The channels for the two tubes are situated back to back or spaced.

When the cable is submitted to a twisting moment, twisting of the cable on itself is facilitated by the fact that the thickness of the insulating material is reduced at the positions of the channels with respect to a non-channelled cable with the same external diameter.

The braid $2b$ is particularly useful for ensuring that the tubes do not increase in volume under the effect of the pressure of the cooling water which circulates in the cable.

In certain cases, and particularly for other applications, the braid can be dispensed with or replaced by another insulator.

Also in certain cases, the outer tube $2c$ or the inner tube $2a$ can be dispensed with.

We claim:

1. A welding device comprising:
   a welding device having at least first and second members;
   said first member being movable with respect to said second member during operation of the welding device; and
   a cable member fixed to both first and second members, said cable having at least one electrical conductor at a central portion thereof and an insulation tube surrounding said electrical conductor, said tube being generally cylindrical with longitudinally extending channels formed at both the inner and outer peripheries thereof.

2. A cable member comprising:
   at least one electrical conductor at a central position thereof; and
   an insulation tube surrounding said electrical conductor, said insulation tube being generally cylindrical with longitudinally extending channels formed at both the inner and outer peripheries thereof.

3. A cable member according to claim 2, wherein said insulation tube comprises two tube members, one situated inside the other.

4. A cable member according to claim 3, wherein said two tube members are separated by an insulator.

5. The cable member according to claim 2, characterized in that there are a plurality of said electrical conductors within said insulation tube, each conductor being additionally surrounded by a separate insulating member.

6. The cable member according to claim 5, characterized in that a passageway for coolant fluid is provided interiorly of the conductors.

* * * * *

UNITED STATES PATENT AND TRADEMARK OFFICE
CERTIFICATE OF CORRECTION

PATENT NO. : 4,853,516

DATED : August 1, 1989

INVENTOR(S) : Julien et al.

It is certified that error appears in the above-identified patent and that said Letters Patent is hereby corrected as shown below:

<u>Title Page, Item [75]</u>
Correct the Inventors Line to:

Regis Julien, of 15 Rue de Chartre, 91400 Orsay, France

Signed and Sealed this

Twenty-fourth Day of July, 1990

*Attest:*

HARRY F. MANBECK, JR.

*Attesting Officer*     *Commissioner of Patents and Trademarks*